United States Patent [19]

Colonel et al.

[11] Patent Number: 4,869,479
[45] Date of Patent: Sep. 26, 1989

[54] SPRING FOR FLOORS AND THE LIKE

[76] Inventors: Richard C. Colonel, P.O. Box 2192, Bellevue, Wash. 98007; Devere V. Lindh, 1910 Dogwood Dr. SE; Frederick A. Sutton, 1815 Dogwood Dr., both of Auburn, Wash. 98002

[21] Appl. No.: 217,769

[22] Filed: Jul. 12, 1988

[51] Int. Cl.$^4$ .................................................. F16E 1/18
[52] U.S. Cl. ...................................... 267/158; 52/480; 267/160; 267/164; 267/152; 267/141
[58] Field of Search .............................. 267/152–165, 267/148–149, 140.1–141.7, 292–294, 36.1–36.53, 24, 30, 31, 35, 140, 227; 52/480, 403, 167, 346, 402, 479, 347, 481; 293/130, 135, 138–140, 154, 155, 146–153; 5/236 R, 236 B, 238; 272/3, 101, 65, 66, 9; 108/51.1; 248/634, 632

[56] References Cited

U.S. PATENT DOCUMENTS

| | | | |
|---|---|---|---|
| 1,570,526 | 1/1926 | Robinson | 293/130 |
| 1,579,184 | 3/1926 | Weiland | 293/149 |
| 1,651,079 | 11/1927 | Wernig | 293/149 |
| 1,666,111 | 4/1928 | Sussin | 293/146 X |
| 1,702,941 | 2/1929 | Hardy | 293/146 X |
| 1,703,666 | 2/1929 | Goetz | 293/146 |
| 1,774,672 | 9/1930 | Rush | 293/146 |
| 1,935,537 | 11/1933 | Balduf | 52/346 |
| 2,037,215 | 4/1936 | D'Andrea | 293/130 |
| 2,056,957 | 10/1936 | Colbridge | 267/33 |
| 2,317,057 | 4/1943 | Higby | 267/31 X |
| 2,358,426 | 9/1944 | Tompson | 272/3 |
| 2,406,746 | 9/1946 | Davis | 267/164 X |
| 3,402,924 | 9/1968 | Rix | 267/141 |
| 3,417,984 | 12/1968 | Sindlinger | 267/160 |
| 3,650,520 | 3/1972 | Vernon et al. | 267/141 X |
| 3,671,997 | 6/1972 | Sigmund | 267/164 X |
| 3,895,835 | 7/1975 | Thomson | 267/140 X |
| 4,015,760 | 4/1977 | Bott | 293/128 X |
| 4,218,599 | 8/1980 | Garn | 267/140 X |
| 4,460,170 | 7/1984 | Lundberg et al. | 272/65 |
| 4,667,921 | 5/1987 | De Goncourt | 267/158 X |

FOREIGN PATENT DOCUMENTS

| | | | |
|---|---|---|---|
| 555577 | 3/1957 | Belgium | 267/141 |
| 655469 | 1/1938 | Fed. Rep. of Germany | 267/47 |
| 728501 | 11/1942 | Fed. Rep. of Germany | 267/35 |
| 2716233 | 10/1978 | Fed. Rep. of Germany | 267/164 |
| 0090433 | 6/1982 | Japan | 267/36.1 |
| 2148450 | 5/1985 | United Kingdom | 267/47 |
| 8701339 | 3/1987 | World Int. Prop. O. | 267/47 |

Primary Examiner—Douglas C. Butler
Attorney, Agent, or Firm—Robert W. Jenny

[57] ABSTRACT

The spring is one piece and elliptical with the working material concentrated nearer the ends than the middle section, leaving the middle section available for deflection limiting stops and for fastening holes. A preferred material is acetal plastic. The spring can be machined, molded or cut from extrusions in widths to suit use requirements. The spring is attached to mounting structure by a fastener which passes through a hole in one leaf and is seated on the other.

1 Claim, 1 Drawing Sheet

SPRING FOR FLOORS AND THE LIKE

BACKGROUND OF THE INVENTION

1. Field

The subject spring is in the field of springs in general but more specifically in the field of springs used in multiple for supporting widely and evenly distributed masses such as floors. Still more specifically, the spring is in the field of springs having low profiles and relatively high spring rates.

2. Prior Art

There is much prior art in this field. It is well known that dance floors, particularly those used for folk dancing, have been supported on springs, the practice going back perhaps hundred of years. The purpose of the springiness of the floor is considered to add to the exhilaration of the dancing. However, in recent years at least it has been recognized that the resilience of the floor reduces fatigue and chances of injury of the users of the floor and that the effects are synergistic. Therefore there is increasing use of spring mounted floors, particularly for sports activities and the installing and maintaining of the floors and support apparatus has become clearly cost competitive. Therefore a prime objective of the subject invention is to provide floor springs at low cost. A further objective is that the spring have a low height relative to its maximum deflection, a ratio of 3 to 1 being desirable. Other desired objectives are corrosion resistance, low part count, simple installation, high fatigue life and optimum wear resistance. Maximum deflections of floor support springs are commonly in the range of $\frac{3}{8}$ to $\frac{1}{2}$ inch, spring rates are in the range of 500 to 2500 pounds per inch of deflections and each spring supports about one square foot of floor.

SUMMARY OF THE INVENTION

The subject spring is made of plastic, is rectangular when viewed from the top and bottom and generally elliptical in the sideview having an outer surface and an inner surface, symetrically disposed with a variable wall thickness between them.

It is a variation of an elliptical spring as shown on page 1565 of Kent's Mechanical Engineers Handbook, Copyright 1923. However, whereas conventional elliptical springs comprise leaf springs pivoted at their ends with the thicker material toward the center, the subject spring is one piece with sections thicker at the ends than in the center portions. The purposes of these differences are to locate the highly stressed working material away from the center located fastening points which could be considered stress raisers and to lower cost of manufacture.

The deflection direction is perpendicular to the major axis, the spring being installed with its major axis parallel to the floor surface. The surface contacting the under side of the support floor, i.e. the top of the spring, and the surface contacting the structure supporting the springs, i.e. the bottom of the spring, are flat. The flat areas are midway between the ends of the spring and about one third the length of the spring. Also, the width of the spring is about one of its length so that the flat areas are essentially square. The wall thickness is greatest at the ends of diminishes from the ends to a minimum at the edges of the flat areas. It then increases abruptly to form two flat surfaces parallel to the flat areas. These flat surfaces serve as deflection limiters. The spring is attached to the appropriate support structure by one headed fastener which extends through holes normal to the flat areas and located at their geometric centers. The hole through one wall of the spring allows passage of the fastener head. The hole in the other wall allows passage of the shank of the fastener.

Choice of material from which the spring is made is critical to its meeting its objectives. Acetal plastic material such as Delrin made by the Dupont Co. has been found to meet the requirements. This material is available with a range of characteristics. Material with a modulus of elasticity of the range of 300,000 to 350,000 pounds per square inch and a density of approximately 0.05 pounds per cubic inch has been found to be satisfactory. The material can be readily molded, extruded and machined. A preferred method for manufacture of the subject spring comprises the steps of making extrusions in the shape of the plan view, cutting individual springs from the extrusion in desired widths and then drilling the fastener holes.

The invention is described in more detail below with reference to the accompanying drawings.

DETAILED DESCRIPTION OF THE INVENTION

Figure 1:
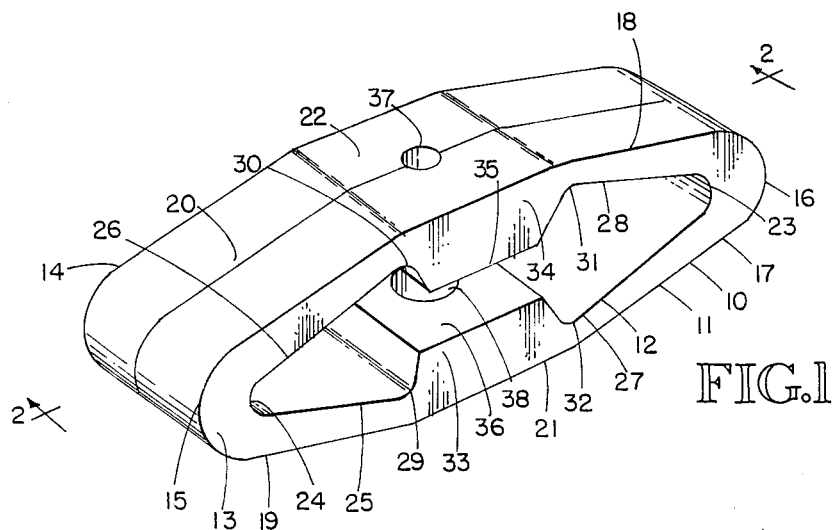
FIG. 1 is a perspective view of the spring.

Referring to FIG. 1 the spring 10 has an outer surface 11 and an inner surface 12. The two surfaces are symmetrical about their axes in each view and are symmetrical oriented with respect to each other and the distance between them is termed the wall thickness. The sides 13 and 14 of this embodiment of the spring are flat and parallel. The outer surface comprises radiused ends 15 and 16, and surfaces 17, 18, 19 and 20 sloping from the ends to flat areas 21 and 22. The inner surface comprises radiused ends 23 and 24, surfaces 25, 26, 27 and 28 sloping to radiused corners 29, 30, 31 and 32 and protrusions 33 and 34 having flat surfaces 35 and 36 parallel to areas 21 and 22.

The wall thickness is greatest at the ends of tapers uniformly to its thinnest at the junctures of the sloping surfaces with the flat areas and deflection limiting protrusions.

Figure 2:
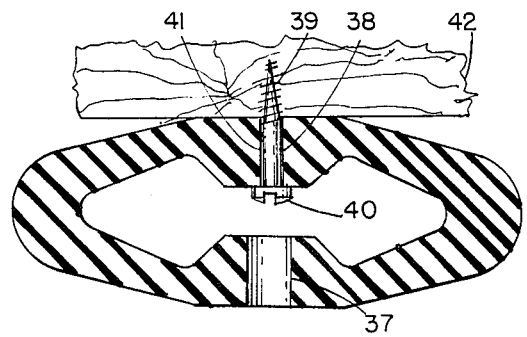
FIG. 2 is a sectional view of the spring taken at 2—2 in FIG. 1 and showing the attachment of the spring to a support structure.

Holes 37 and 38 facilitate attachment of the spring to support structure as shown in FIG. 2. Headed fastener 39 is inserted through the holes, hole 37 being large enough to allow passage of fastener head 40 and hole 38 being sized for shank 41 of the fastener. The fastener engages structure 42 to hold the spring in place.

Figure 3:
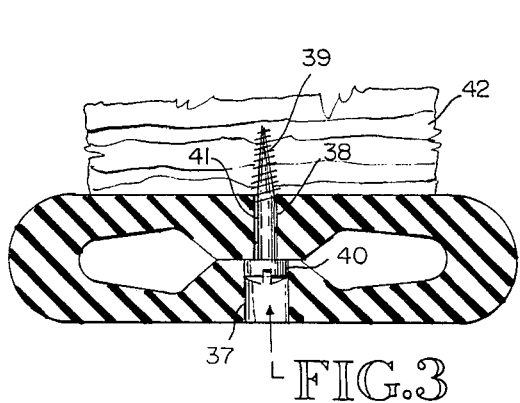
FIG. 3 is a side view of the spring when fully compressed.

In FIG. 3 a load signified by arrow L has deflected the spring to bring surfaces 35 and 36 into contact, this being the maximum deflection of the spring. The spring is designed for full deflection for the required number of times without failure.

The spring can be considered to comprise two leaves integrally connected at their ends and having section thickness greatest at the ends, decreasing toward the midlength portions.

Figure 4:
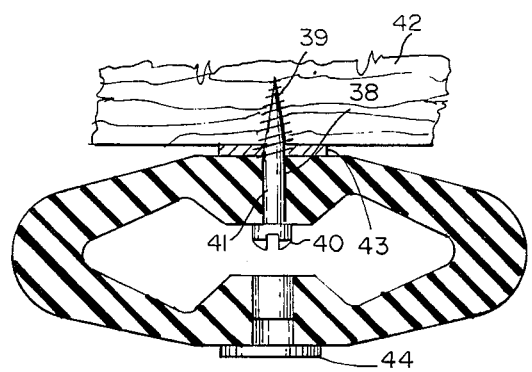
FIG. 4 is a sectional view similar to FIG. 2 but with wear resistant inserts installed.

In FIG. 4 washer 43 and insert 44 are installed. One or both of these parts are used if the use situation is such that rubbing at areas 21 and by 22 may cause unacceptable wear of the spring material. Parts 43 and 44 are made of any of the highly wear resostant material known in the art.

In a preferred embodiment the spring is 3¼ inches long, 1⅛ inches wide and the maximum deflection is ⅜ of an inch.

It is considered to be understandable from this description that the subject invention meets its objective. Being a single piece, moldable or made from extrusions, it is economical to manufacture. Its height is low relative to its maximum deflection, the height being approximately 3 times the maximum deflection. The material used is corrosion resistant and the material characteristics and design details enable a long life of the spring. Wear resistance of the spring is basically good because of the characteristics of the chosen material but can be optimized by use of wear resistant parts. The load capability of the spring can be changed by changing the width of the spring, i.e., for example, cutting narrower or wider segments from the extrusions from which the springs are made.

It is considered to be further understood that while a preferred embodiment of the spring is disclosed herein, other embodiments and variations of the one disclosed are possible within the scope of the invention which is limited only by the appended claims.

What is claimed is:

1. Spring apparatus comprising:

a fastener having a head and a shank, said head having a head diameter, said shank having a shank diameter, a washer, an insert and a one piece elliptical spring having a plan view shape, first and second ends, a width and a length and first and second walls having wall thickness, said spring being a one piece elliptical spring for use in supporting floors and the like, and being supported by spring support structure, said floors and the like having an underside, said spring having a first surface contacting said underside and a second surface contacting said spring support structure, said first and second surfaces being flat, located midway between said first and second ends and extending for approximately one-third of said length, said surfaces having geometric centers and first and second edges transverse to said length, said width being approximately one-third of said length, said wall thickness being greatest at said ends, diminishing from said ends to a minimum at said first and second edges, then increasing abruptly to form third and fourth surfaces parallel to said first and second surfaces, said third and fourth surfaces functioning as limit stops, said spring having a first hole in said first wall at said geometric center of said first surface and normal to said first surface and having a first hole diameter sufficient to allow passage of said head, said spring having a second hole in said second wall at said geometric center of said second surface and normal to said second surface and having a second hole having a diameter greater than said shank diameter and less than said head diameter, whereby said spring is attached to said support structure by said fastener which passes through said first hole and into and through said second hole and said washer such that said head engages said second wall and holds said spring in place against said washer and said washer against said support structure, said insert being inserted into said first hole, whereby it serves as a wear point in contact with said underside, said spring being made of acetal plastic having a modulus of elasticity in the range of 300,000 to 350,000 pounds per square inch and a density of approximately 0.05 pounds per cubic inch, said spring being manufacturable by providing extrusions having said plan view shape and cutting individual spring from said extrusions to said width and drilling said first and second holes.

* * * * *